United States Patent
Aggarwal (10) Patent No.: US 7,236,638 B2
(45) Date of Patent: Jun. 26, 2007

(54) METHODS AND APPARATUS FOR REDUCTION OF HIGH DIMENSIONAL DATA

(75) Inventor: Charu C. Aggarwal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 10/208,523

(22) Filed: Jul. 30, 2002

(65) Prior Publication Data

US 2004/0022445 A1  Feb. 5, 2004

(51) Int. Cl.
G06K 9/36 (2006.01)
G06K 9/46 (2006.01)

(52) U.S. Cl. ............... 382/240; 382/224; 382/232; 707/1

(58) Field of Classification Search ............ 382/232, 382/233, 240, 224, 225, 226, 227, 228; 707/1, 707/100, 101, 102; 341/79
See application file for complete search history.

(56) References Cited

U.S. PATENT DOCUMENTS 5,848,404 A * 12/1998 Hafner et al. ............... 707/3
5,930,392 A *  7/1999 Ho ............................. 382/224
6,154,746 A * 11/2000 Berchtold et al. .......... 707/100
6,570,991 B1 *  5/2003 Scheirer et al. ............. 381/110
6,834,278 B2 * 12/2004 Yu et al. ..................... 707/2

OTHER PUBLICATIONS

D. Achlioptas, "Database-Friendly Random Projections," ACM PODS Conference, 8 pages, 2001.
C.C. Aggarwal et al., "Finding Generalized Projected Clusters in High Dimensional Spaces," ACM SIGMOD Conference, 12 pages, 2000.
K. V. Ravi Kanth et al., "Dimensionality Reduction for Similarity Searching in Dynamic Databases," SIGMOD Conference, pp. 166-176, 1998.
C.H. Papadimitriou et al., "Latent Semantic Indexing: A Probabilistic Analysis," ACM PODS Conference, pp. 159-168, 1998.
C. Faloutsos et al., "FastMap: A Fast Algorithm for Indexing, Data-Mining and Visualization of Traditional and Multimedia Datasets," ACM SIGMOD Conference, pp. 163-173, 1995.

* cited by examiner

Primary Examiner—Matthew C. Bella
Assistant Examiner—Ali Bayat
(74) Attorney, Agent, or Firm—Ryan, Mason & Lewis, LLP

(57) ABSTRACT

Data compression techniques particularly applicable to high dimensional data. The invention uses a hierarchical partitioning approach in conjunction with a subspace sampling methodology which is sensitive to a subject data set. The dual nature of this hierarchical partitioning and subspace sampling approach makes the overall data compression process very effective. While the data compression process provides a much more compact representation than traditional dimensionality reduction techniques, the process also provides hard bounds on the error of the approximation. Also, the data compression process of the invention realizes a compression factor that improves with increasing database size.

27 Claims, 7 Drawing Sheets

METHODS AND APPARATUS FOR REDUCTION OF HIGH DIMENSIONAL DATA

FIELD OF THE INVENTION

The present invention is related to data compression techniques and, more particularly, to reduction techniques applicable to high dimensional data.

BACKGROUND OF THE INVENTION

In recent years, the advances in hardware technology have made it possible to collect large amounts of data in many domains or applications. Such data sets often have a very high dimensionality associated therewith. Examples of such domains include supermarket data, multimedia data and telecommunication applications. Data sets which are inherently high dimensional may include, for example, demographic data sets in which the dimensions comprise information such as the name, age, salary, and numerous other features which characterize a person. This often results in massive data tables whose sizes are on the order of terabytes. In such cases, it is desirable to reduce the data in order to save on critical system resources such as storage space, transfer time of large files, and processing requirements. In addition, many database and data mining applications can be implemented more efficiently on reduced representations of the data.

A well known technique for dimensionality reduction is the method of Singular Value Decomposition (SVD), see, e.g., Kanth et al., "Dimensionality Reduction for Similarity Searching in Dynamic Databases," SIGMOD Conference, 1998; and C. Faloutsos et al., "FastMap: A Fast Algorithm for Indexing, Data-Mining and Visualization of Traditional and Multimedia Datasets,"0 ACM SIGMOD Conference, 1995, the disclosures of which are incorporated by reference herein. In general, SVD projects data into a lower dimensional subspace. The idea is to transform the data into a new orthonormal coordinate system in which second order correlations are eliminated. In typical applications, the resulting axis system has the property that the variance of the data along many of the new dimensions is very small. These dimensions can then be eliminated, resulting in a compact representation of the data with some loss of representational accuracy. However, the SVD dimensionality reduction technique does not provide hard bounds on the deviation of a record from its true value, and is prohibitively expensive for increasing data dimensionality.

Recent research has shown that even though the implicit dimensionality of a given data set may be quite high, particular subsets of the given data set may show data dependencies which lead to much lower implicit dimensionality, see, e.g., C. C. Aggarwal et al., "Finding Generalized Projected Clusters in High Dimensional Spaces," ACM SIGMOD Conference, 2000, the disclosure of which is incorporated by reference herein; and the "Fastmap" approach by C. Faloutsos et al. An effective data compression system would try to optimize the representation of a record depending upon the distribution of the data in its locality. Clearly, it is a non-trivial task to find a representation in which each point adjusts its storage requirements naturally to the corresponding local implicit dimensionality. Since the issue of data compression is most relevant in the context of large data sets, it is also necessary for the computational and representational requirements of such approaches to scale efficiently with increasing data size.

However, the above-referenced technique of C. C. Aggarwal et al. and the "Fastmap" approach are orders of magnitude slower than even the standard dimensionality reduction techniques, and are inflexible in determining the dimensionality of data representation. As a result, the applicability of these methods is restricted to specific applications such as indexing.

In recent years, the technique of random projection has often been used as an efficient alternative for dimensionality reduction of high dimensional data sets, see, e.g., D. Achlioptas, "Database-Friendly Random Projections," ACM PODS Conference, 2001; and C. H. Papadimitriou et al., "Latent Semantic Indexing: A Probabilistic Analysis," ACM PODS Conference, 1998, the disclosures of which are incorporated by reference herein. This technique typically uses spherically symmetric projections, in which arbitrary directions from the data space are sampled repeatedly in order to create a new axis system for data representation. While random projection is a much more efficient process than methods such as SVD, its average reduction quality is not quite as effective.

Thus, there exists a need for techniques which overcome the drawbacks associated with the approaches described above, as well as drawbacks not expressly described above, and which thereby provide more efficient and scalable solutions to the problems associated with data compression.

SUMMARY OF THE INVENTION

The present invention provides effective and scalable data compression techniques. More particularly, the invention uses a hierarchical partitioning approach in conjunction with a subspace sampling methodology which is sensitive to a subject data set.

For example, in one aspect of the invention, a technique for processing a data set comprises the following steps. First, data points from the data set are sampled to create hierarchically arranged subspaces from the sampled data points. Then, data points from the data set are projected onto the hierarchically arranged subspaces. The hierarchically arranged subspaces with the projected data points are then stored as a compressed representation of the data set.

Advantageously, the dual nature of this hierarchical partitioning and subspace sampling approach makes the overall data compression process very effective. While the data compression process of the invention provides a much more compact representation than traditional dimensionality reduction techniques, the process also provides hard bounds on the error of the approximation.

Another advantageous property of the data compression process of the invention is that the process realizes a compression factor that improves with increasing database size. This is different from other dimensionality reduction techniques, wherein the compression ratio is largely unaffected by database size. This behavior with increasing database size is especially significant, since the data compression problem is motivated by the large size of data sets. The use of a sampling approach in accordance with the invention also results in a computationally efficient implementation which is substantially linearly scalable, both with respect to data set size and dimensionality.

In addition, a locality specific multi-dimensional representation, generated in accordance with the present invention, makes the reduced data amenable to use in database applications such as a nearest neighbor search. In fact, the subspace sampling methodology of the invention reveals important local characteristics of the data which can be used for effective solutions to these problems. It will also be evident that the partitioning created by the hierarchical subspace techniques of the invention can be used for effective nearest neighbor searches in ways that are significantly more effective than currently used dimensionality reduction techniques.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system in which it is desirable to perform efficient, effective and scalable data compression.

As will be illustrated in detail below, the present invention introduces a hierarchical subspace sampling technique for use in creating reduced data representations. The technique is able to estimate the local implicit dimensionalities of each point very effectively, and thereby create a variable dimensionality reduced representation of the data. Such a technique has the advantage that it is very adaptive with respect to adjusting its representation depending upon the behavior of the immediate locality of a data point. It is to be understood that the "implicit dimensionality" of a data set is defined as the least number of dimensions in which the data can be approximately represented or coded without loss of information.

Because of the sampling approach provided in accordance with the invention, the data reduction methodology of the invention is extremely fast and scales linearly both with respect to data set size and dimensionality. Furthermore, the subspace sampling technique is able to reveal important local subspace characteristics of high dimensional data which can be harnessed for effective solutions to problems such as approximate nearest neighbor search.

More specifically, the invention proposes the use of a hierarchical subspace sampling approach in which selection of subspaces is determined by the local properties of the particular data set under consideration. The use of a locality sensitive random sampling approach results in a system which is both more effective and efficient than SVD, while providing worst case bounds on the error loss of each record. The locality sensitive sampling method uses a hierarchical subspace sampling approach in which the storage requirement of each data point is influenced by the corresponding local implicit dimensionality. This variation from the global approach of standard dimensionality reduction methods has the interesting property that local implicit dimensionalities can be estimated more robustly for larger data sets.

As a result, the effectiveness of compression improves with increasing database size. It is to be noted that this is a unique feature over any known dimensionality reduction technique. It is also especially important in the context of larger data sets which are the motivating factor for the dimensionality reduction problem.

In addition, it will be illustrated that the local characteristics of the data revealed by the hierarchical subspace sampling technique of the invention can be effectively leveraged for innovative solutions to problems such as nearest neighbor indexing.

In order to facilitate further description of these concepts, additional notations and definitions will now be introduced. It is assumed that the data set is denoted by D. The number of points (data points) in the data set is denoted by N and the dimensionality by d. The full dimensional data space is denoted by U. We define a l-dimensional hyperplane $H(y, E)$ by an anchor y and a mutually orthogonal set of vectors $E=\{e(1) \ldots e(l)\}$. The hyperplane passes through y, and the vectors in E form the basis system for its subspace. The projection of a point x' onto this hyperplane is denoted by $P(x, y, E)$ and is the closest approximation of x, which lies on this hyperplane. In order to find the value of $P(x, y, E)$, y is used as the reference point. Specifically, the projections of x−y onto $e(1) \ldots e(l)$ are determined. Then, the resulting point is translated by the reference point y.

Figure 1A:
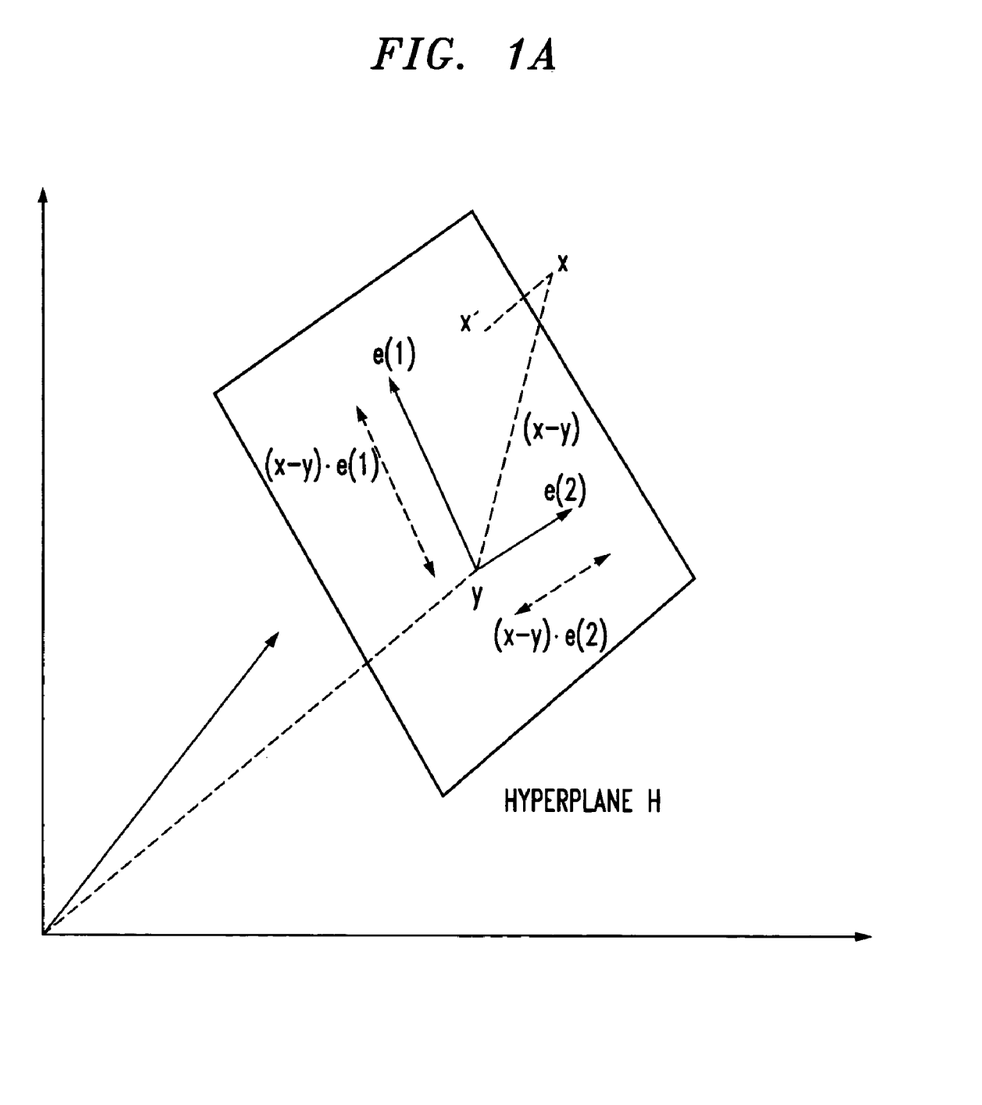
FIG. 1A is a diagram illustrating a method in which coordinates are computed in a compressed data representation for use in illustrating an embodiment of the present invention.

Referring initially to FIG. 1A, a diagram illustrates a method in which coordinates are computed in a compressed data representation for use in illustrating an embodiment of the present invention. More specifically, a pictorial representation of $x'=P(x, y, E)$ is illustrated in FIG. 1A. We note that x' can be represented in the orthonormal axis system for E with the use of only l coordinates $((x-y) \cdot e(1) \ldots (x-y) \cdot e(l))$, where · represents the dot product operation. This incurs the additional overhead of maintaining y and E. However, this is a constant storage overhead, which can be amortized over the large number of points stored on this hyperplane. The error of approximating x with $P(x, y, E)$ is given by the Euclidean distance between x and $P(x, y, E)$ and is denoted by $\Delta(x, y, E)$. The lossy compression system described herein determines locality specific hyperplanes, so that for each data record, this value is less than a prespecified tolerance $\epsilon$. In other words, for each data point x projected into a hyperplane denoted by (y, E), we have $\Delta(x, y, E) \Leftarrow \epsilon$.

Further, let $P=(x(1) \ldots x(l+1))$ be a set of (l+1) linearly independent points. The representative hyperplane R(P) of P is defined as the l-dimensional hyperplane which passes through each of these (l+1) points.

The hyperplane R(P) can also be represented with the use of any point y on the hyperplane, and an orthonormal set of vectors $E=\{e(1) \ldots e(l)\}$, which lie on the hyperplane. We shall call (y, E) the axis representation of the hyperplane, whereas the set P is referred to as the point representation. Thus, R(P) (i.e., point representation) is the same as H(y, E) (i.e., axis representation). It is to be noted that there can be infinitely many point or axis representations of the same hyperplane. The axis representation is more useful for performing distance computations of the hyperplane from individual points in the database, whereas the point representation has advantages in storage efficiency in the context of a hierarchical arrangement of subspaces. This will be explained in further detail below.

Still further, the invention introduces a subspace tree, which is a conceptual organization of subspaces used in the data compression technique of the invention. This conceptual organization imposes a hierarchical arrangement of the subspaces of different dimensionalities. The hierarchical organization is also useful in developing variable dimensionality representations of the data. Each node in the subspace tree corresponds to a hyperplane along with its representative set which is drawn from the database D. The nodes at level-m in the subspace tree correspond to m-dimensional subspaces. The root node corresponds to the null subspace. Thus, the dimensionality of the hyperplane for any node in the tree is determined by its depth. The subspace at a node is hierarchically related to that of its immediate parent. Each subspace other than the null subspace at the root is a one-dimensional extension of its parent hyperplane. This one-dimensional extension is obtained by adding a sampled data point to the representative set of the parent hyperplane. In order to further illustrate the concept of a subspace tree, an example will now be given.

Figure 1B:
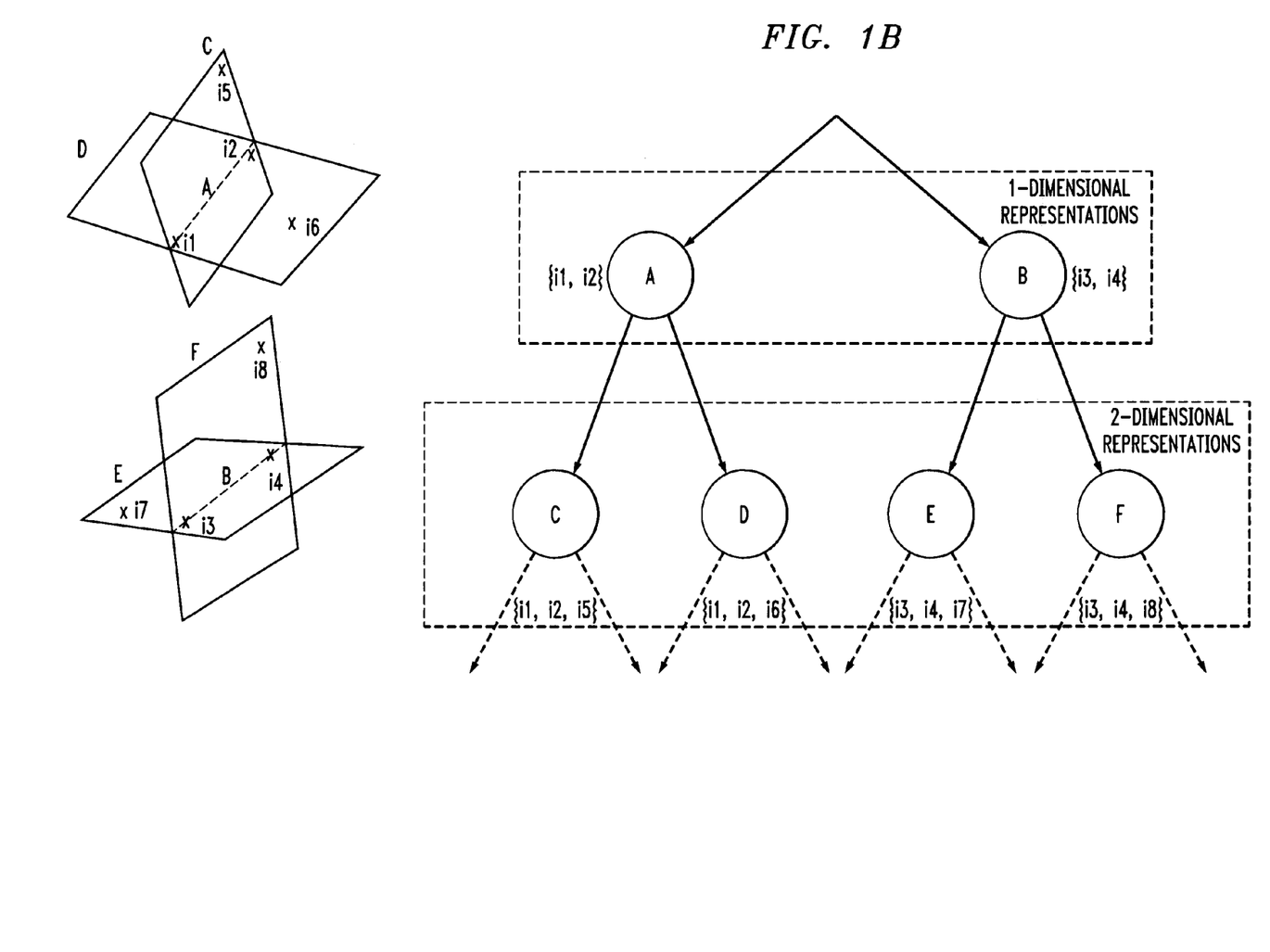
FIG. 1B is a diagram illustrating a hierarchically arranged set of subspaces for use in illustrating an embodiment of the present invention.

Referring now to FIG. 1B, a diagram illustrates a hierarchically arranged set of subspaces for use in illustrating an embodiment of the present invention. More specifically, FIG. 1B contains a two-level tree structure which corresponds to one and two-dimensional subspaces. For each level-1 node in the tree, two points are stored which correspond to the one-dimensional line for that node. For each lower level node, an additional data point is stored which increases the dimensionality of its parent subspace by one. Therefore, for a level-m node, the representative set is of cardinality (m+1). For example, in the case of FIG. 1B, the node A in the subspace tree (with representative set $\{i(1), i(2)\}$ corresponds to the one-dimensional line defined by $\{i(1), i(2)\}$. This node is extended to a two-dimensional hyperplane in two possible ways corresponding to the nodes C and D. In each case, an extra point needs to be added to the representative set for creating the one-dimensional extension. In order to extend to the two-dimensional hyperplane for node C, we use the point i(5), whereas in order to extend to the hyperplane for node D, we use the point i(6). Note from FIG. 1B that the intersection of the two-dimensional hyperplanes C and D is the one-dimensional line A.

The subspace tree is a hierarchical arrangement of subspaces with the following properties: (1) nodes at level-m correspond to m-dimensional hyperplanes; (2) nodes at level-(m+1) correspond to hyperplanes which are one-dimensional extensions of their parent hyperplanes at level-m; and (3) the point representative set of a level-(m+1) node is obtained by adding a sampled data point to the representative set of its m-dimensional parent subspace.

Given the above-explanation of the concept of a subspace tree, we will now explain illustrative algorithmic processes of construction. It is to be appreciated that by carefully sampling the data points and constructing the subspace tree, each data point can typically be represented in a relatively low dimensional subspace with very little reconstruction loss.

Once a subspace tree has been constructed, each data point x is assigned to a node in this tree, so that the distance of the corresponding hyperplane from x is less than the compression tolerance $\epsilon$. The data point x is represented in terms of its coordinates on the hyperplane to which it is assigned. Thus, the amount of space needed to represent x depends only on the dimensionality of the corresponding hyperplane rather than the dimensionality of D. Since higher levels of the tree require lower storage overhead, it is desirable to assign x to as high a level of the tree as possible.

Figure 1C:
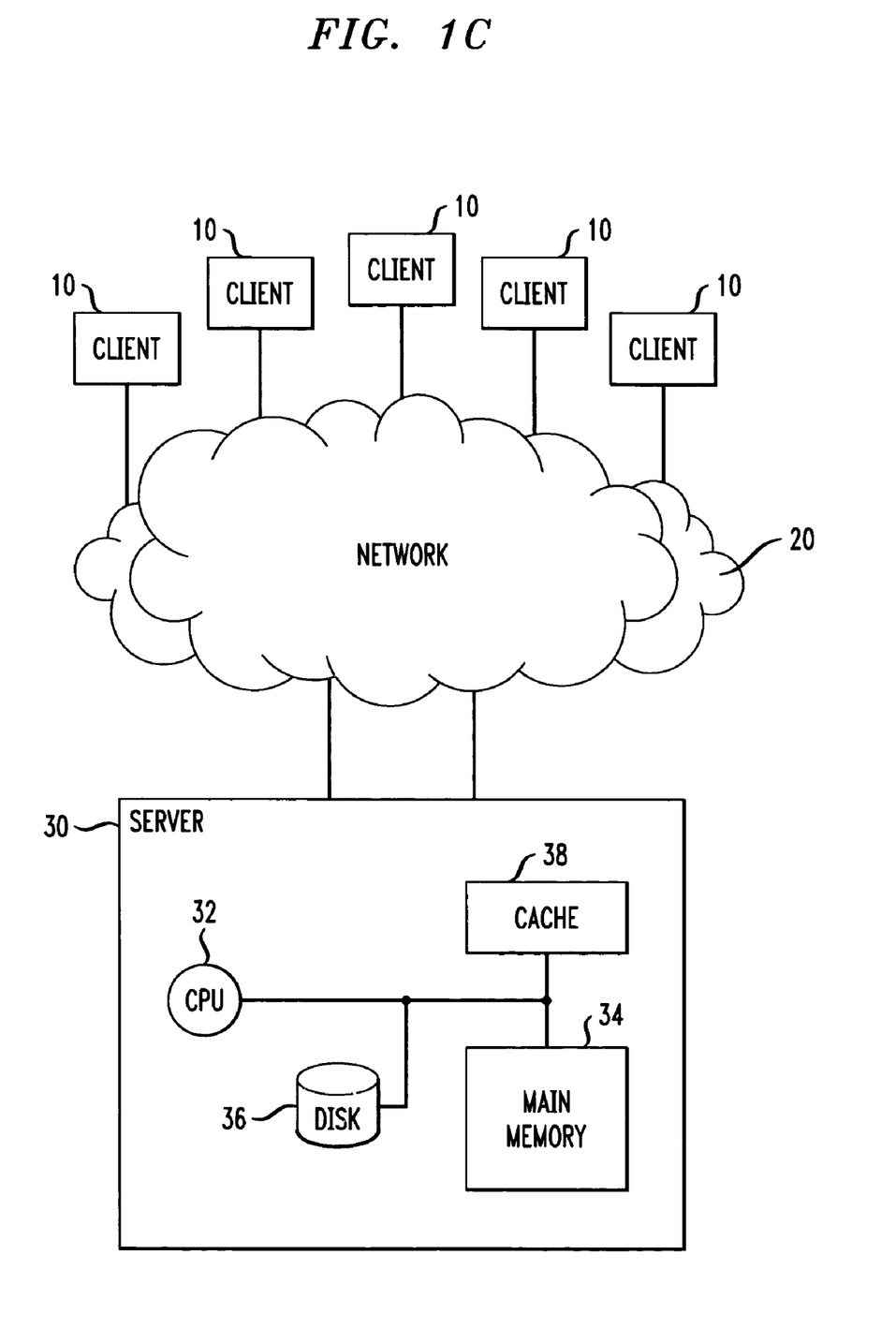
FIG. 1C is a block diagram illustrating a hardware implementation suitable for employing methodologies according to an embodiment of the present invention.

Referring now to FIG. 1C, a block diagram illustrates a hardware implementation suitable for employing methodologies according to an embodiment of the present invention. As illustrated, an exemplary system comprises client devices 10 coupled via a large network 20 to a server 30. The server 30 may comprise a central processing unit (CPU) 32 coupled to a main memory 34 and a disk 36. The server 30 may also comprise a cache 38 in order to speed up calculations. It is assumed that multiple clients 10 can interact with the server 30 over the large network 20. It is to be appreciated that the network 20 may be a public information network such as, for example, the Internet or World Wide Web, however, the clients and server may alternatively be connected via a private network, a local area network, or some other suitable network.

The data compression computations of the invention are performed at the CPU 32 on the server 30 and sent to the client devices 10. It is to be understood that the client devices 10 issue the requests for data reduction and also supply the data sets to the server 30. However, all or portions of the data sets to be processed may already be available at the server (e.g., on disk 36), or may be accessible by the server. The main memory 34 is used in order to store some or all of the intermediate results performed during the computations. Results of these computations are then returned to the requesting client devices 10 and presented to the clients.

In one preferred embodiment, software components including instructions or code for performing the methodologies of the invention, as described herein, may be stored in one or more memory devices described above with respect to the server and, when ready to be utilized, loaded in part or in whole and executed by the CPU.

Figure 2:
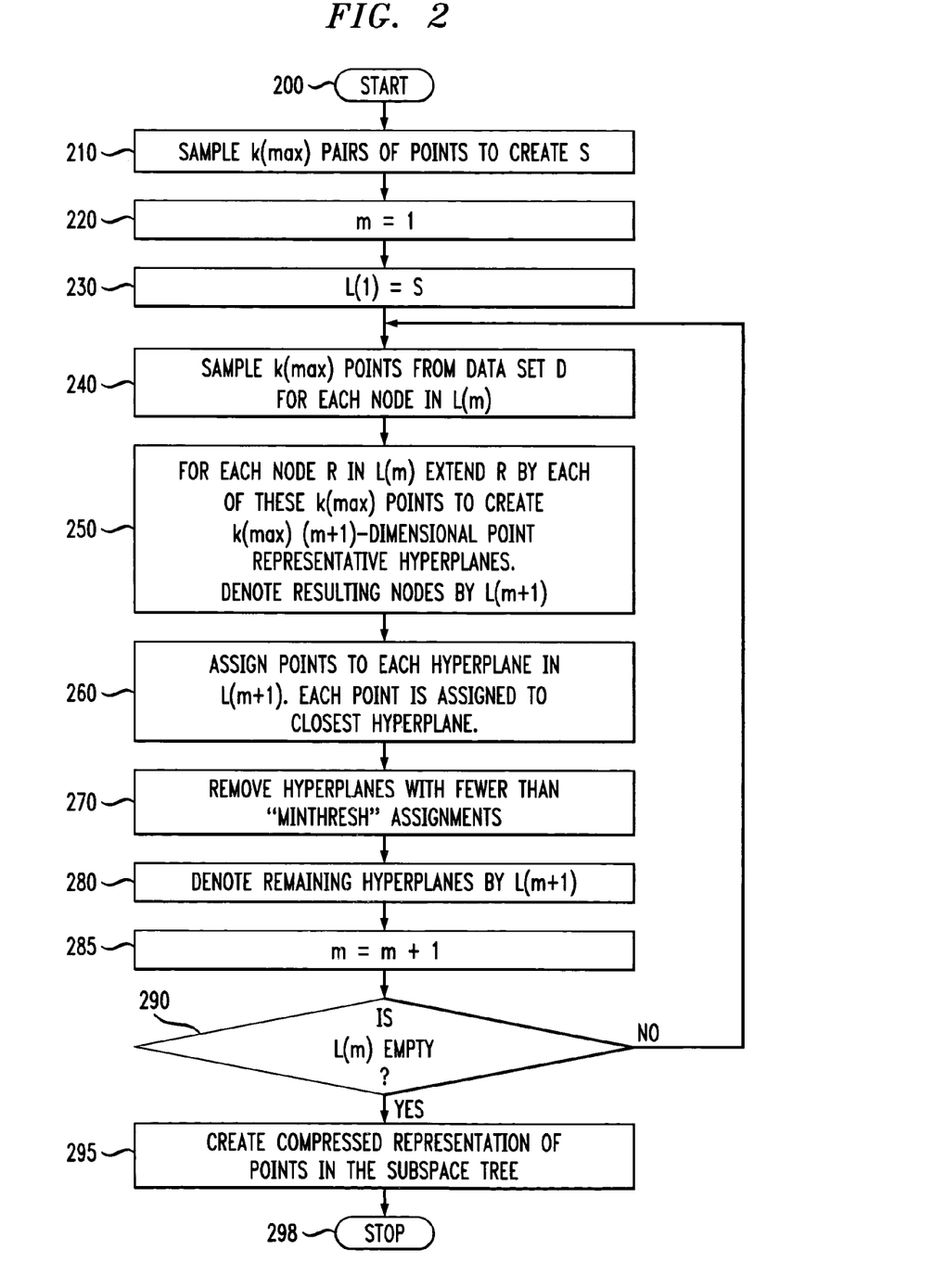
FIG. 2 is a flow diagram illustrating an overall process of subspace tree construction according to an embodiment of the present invention.

Referring now to FIG. 2, a flow diagram illustrates an overall process of subspace tree construction according to an embodiment of the present invention. The subspaces for the invention are constructed using a top down process. As described above, the mth level of the tree corresponds to m-dimensional subspaces.

The process begins at block 200. In step 210, the process samples k(max) pairs of points to create k(max) one-dimensional subspaces. This set of one-dimensional subspaces is denoted by S. In step 220, m is set to 1. In step 230, L(1) is set to S. In step 240, k(max) points are sampled from data set D for each node in L(m). In step 250, for each node R in L(m), R is extended by each of these k(max) points to create k(max) (m+1)-dimensional point representative hyperplanes. The resulting nodes are denoted by L(m+1).

Next, in step 260, points are assigned to each hyperplane in L(m+1). This assignment is done such that each point is assigned to its closest hyperplane. In step 270, the hyperplanes with fewer than "minthresh" (a predetermined minimum threshold value) assignments are removed. An exemplary value for "minthresh" may range between 5 and 100. These are the outlier hyperplanes. For the case of the outlier hyperplanes, the points need to be stored in their original format. The remaining hyperplanes are denoted by L(m+1) in step 280.

In step 285, m is incremented by one. The process checks whether L(m) is empty in step 290. If not, then the process returns to step 240 to create even higher dimensional subspaces. On the other hand, if L(m) is empty, then the compressed representation of the points in the subspace tree is created in step 295. The process of creating the compressed representation of the points will be described in further detail below. The process ends at block 298.

Figure 3:
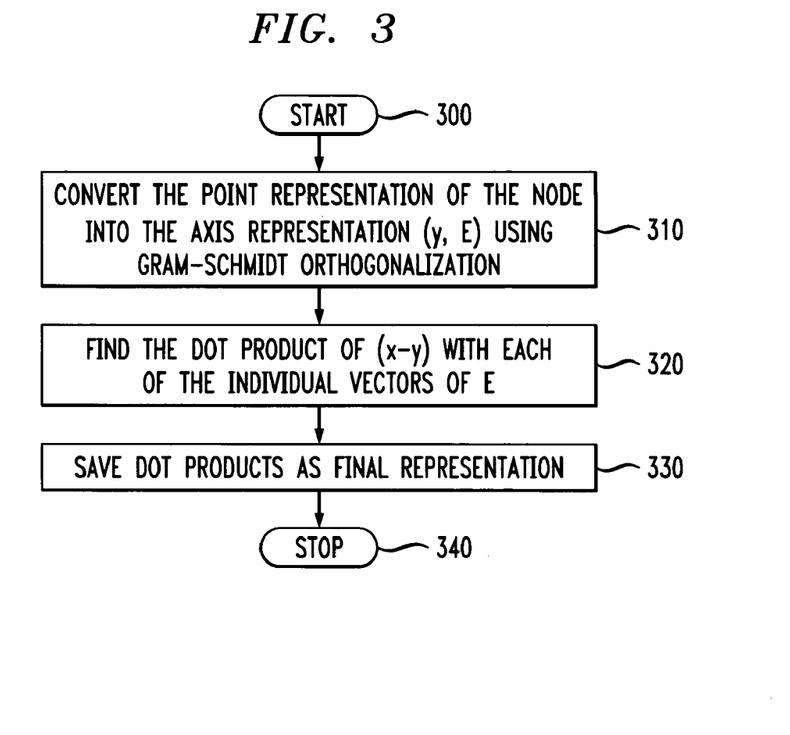
FIG. 3 is a flow diagram illustrating a process of projecting data points onto individual nodes of a subspace tree according to an embodiment of the present invention.

Referring now to FIG. 3, a flow diagram illustrates a process of projecting data points onto individual nodes of a subspace tree according to an embodiment of the present invention. More specifically, FIG. 3 illustrates a process of creating the axis representation of the nodes from the point representation.

The process begins at block 300. In step 310, the process converts the point representation of the node into the axis representation using Gram-Schmidt orthogonalization. It is to be noted that the process of Gram-Schmidt orthogonalization is well known in the art, for example, see K. Hoffman et al., "Linear Algebra," Prentice Hall Inc., the disclosure of which is incorporated by reference. Hence, details of this orthogonalization procedure will not be further described here. It is to be appreciated that alternative methods may be used in place of the Gram-Schmidt procedure.

Next, in step 320, the dot products of (x-y) with the individual vectors of E are computed. These dot products form the appropriate coordinates in the new representation. Therefore, in step 330, the dot products are saved in the final representation. The process ends at block 340. Thus, given data point x and the point representation of the node, the process of FIG. 3 outputs a compressed representation of the data point x.

Figure 4:
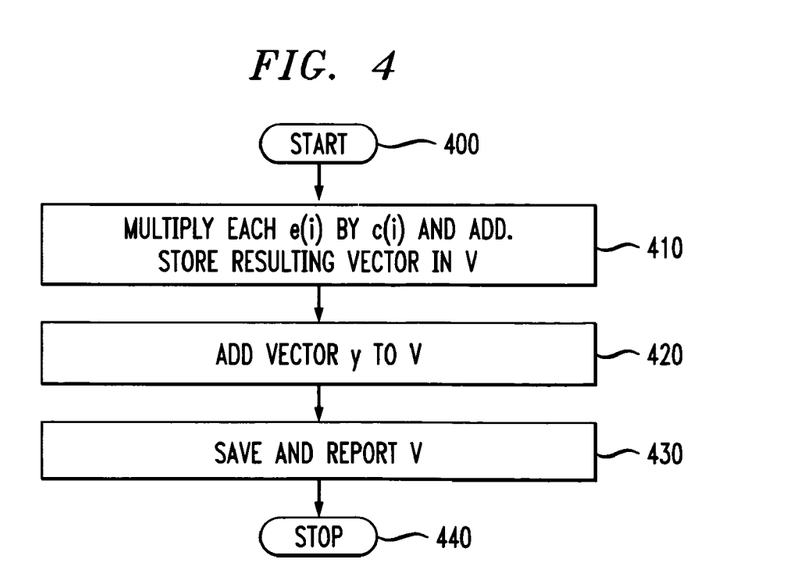
FIG. 4 is a flow diagram illustrating a process of reconstruction of data points from a compressed format according to an embodiment of the present invention.

Referring now to FIG. 4, a flow diagram illustrates a process of reconstruction of data points from a compressed format according to an embodiment of the present invention. More specifically, FIG. 4 illustrates a process of decompression of the individual data points. It is to be noted that during the compression process, each point is assigned to a hyperplane. The axis representation of this hyperplane is used for the decompression process. Assume that (y, E) is the axis representation, and $c(1) \ldots c(l)$ are the corresponding coordinates.

The process begins at block 400. In step 410, the process multiplies each $c(i)$ by $e(i)$ and adds multiplication results. The resulting vector is stored in V. In step 420, the vector y is added to V. The vector V is reported in step 430. The process ends at block 440. Thus, given the axis representation (y, E) and compressed coordinates $c(1) \ldots c(l)$, the process of FIG. 4 outputs the data point x.

Figure 5:
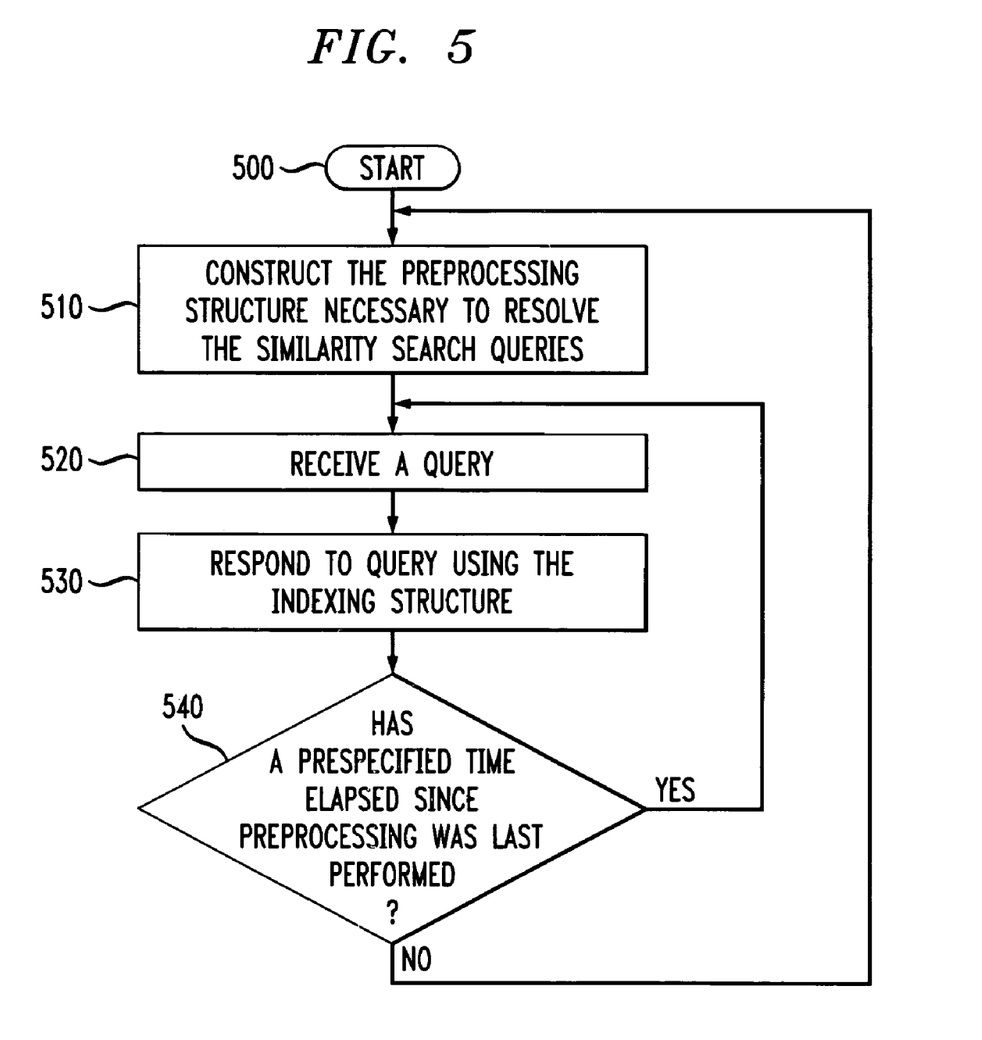
FIG. 5 is a flow diagram illustrating an overall process of computing query responses using an indexing structure according to an embodiment of the present invention.

Referring now to FIG. 5, a flow diagram illustrates an overall process of computing query responses using an indexing structure according to an embodiment of the present invention. More specifically, FIG. 5 illustrates a process of performing a nearest neighbor search using a compressed data representation created in accordance with the present invention.

The process begins at block 500. In step 510, a preprocessing structure which is used for indexing is constructed (i.e., an indexing structure). An illustrative method of how this preprocessing structure is created will be described below in the context of FIG. 6. An illustrative method of how this preprocessing structure is used for the purpose of nearest neighbor search will be described below in the context of FIG. 7. In step 520, the process receives a query. Then, in step 530, the process responds to the query using the indexing structure. Periodically, the preprocessing structure may be updated as new data becomes available. Therefore, in step 540, the process tests whether a prespecified time has elapsed since the preprocessing was last performed. If so, the process goes to step 520, otherwise the process goes to step 510.

Figure 6:
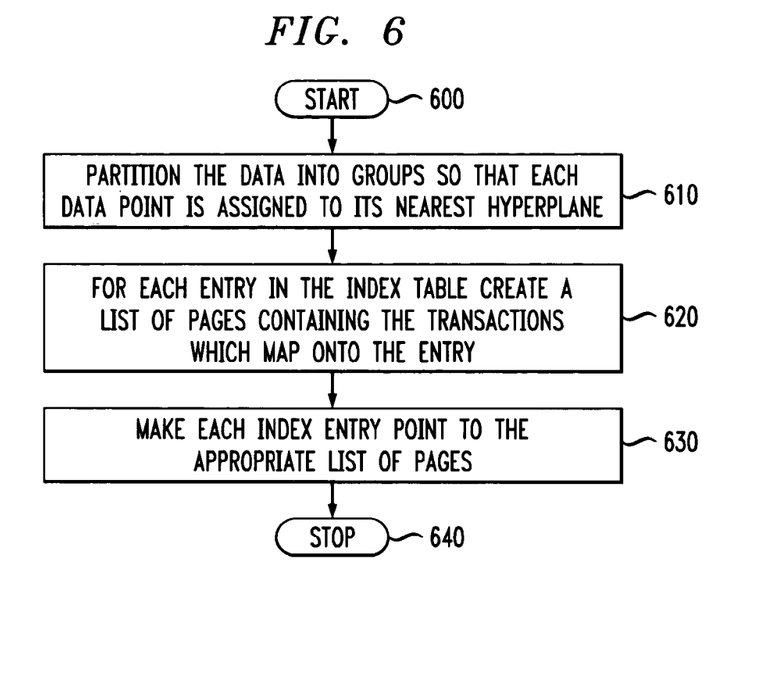
FIG. 6 is a flow diagram illustrating a process of constructing an indexing structure according to an embodiment of the present invention.

Referring now to FIG. 6, a flow diagram illustrates a process of constructing an indexing structure according to an embodiment of the present invention. This can be considered a detailed description of step 510 of FIG. 5.

The process begins at block 600. Input to the process is a subspace tree, formed in accordance with the present invention, and a subject database (one or more data sets). In step 610, the process partitions the subject data of the database into groups so that each point is assigned to its nearest or closest hyperplane. In step 620, for each entry in an index table (which serves as the indexing structure), the process finds the transactions (records) which map onto that entry. A list of pages containing these transactions is created. As is known, a "page" refers to a unit of disk storage. Typically, one page contains multiple records. Finally, in step 630, each index entry is made to point to the appropriate list of pages. The process ends at block 640. Thus, given as input a subspace tree and a database, the process of FIG. 6 outputs an indexing structure.

Figure 7:
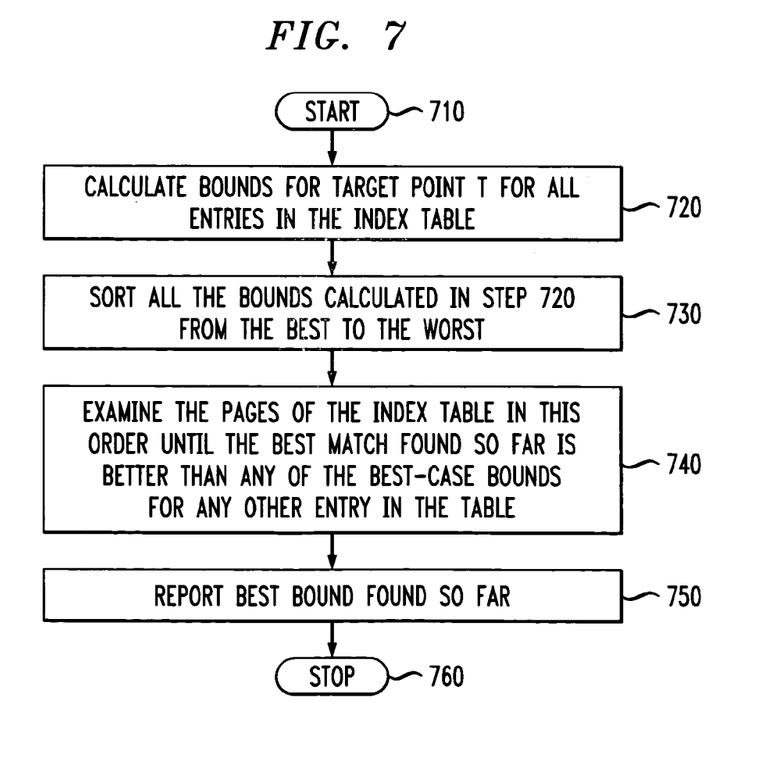
FIG. 7 is a flow diagram illustrating a process of performing a nearest neighbor search procedure on a subspace tree according to an embodiment of the present invention.

Referring now to FIG. 7, a flow diagram illustrates a process of performing a nearest neighbor search procedure on a subspace tree according to an embodiment of the present invention. More specifically, FIG. 7 illustrates a process for finding the closest approximate neighbor to a target point T.

The process begins in block 710. In step 720, the process calculates bounds from the target point T to all entries in an index table (created in accordance with a process such as that described above in the context of FIG. 6). Next, in step 730, all the bounds calculated in step 720 are sorted from best to worst. In step 740, the process examines the pages in the index table in this order until the best match found so far is better than any of the remaining best-case bounds in the index table. In step 750, the best bound found so far is reported. This reported bound is the approximate nearest neighbor distance.

Consider the following example. Assume the index table contains three entries. The first entry points to disk pages containing records which are distances 4, 5, and 7 from the target (best bound=4). The second entry points to records which are distances 8, 10 and 13 from the target (best bound=8). The last entry points to records which are distances 7, 9, 11, and 15 from the target (best bound=15). The three entries are sorted in the order 4, 8, and 15. After scanning the first index entry, a record with distance 4 has already been found, which is better than the best bounds (8 and 15) of the other two entries. Therefore, the records in these entries are effectively pruned since they need never be scanned, and the best bound found so far (e.g., 4) is reported. The process ends at block 760.

Accordingly, as described herein, the present invention provides techniques for effective data compression. The use of such inventive compression techniques is illustrated above in the context of the difficult problem of a similarity search (e.g., nearest neighbor search). However, the invention is not intended to be limited to use with such a search application. Rather, the inventive compression techniques are applicable to a large number of applications such as, by way of further example only, collaborative filtering and electronic commerce. Thus, the compression techniques of the invention are generally useful in applications which store, transfer and/or process large quantities of data.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing a data set, comprising the steps of:
   sampling data points from the data set to create hierarchically arranged subspaces from the sampled data points;
   projecting data points from the data set onto the hierarchically arranged subspaces; and
   storing the hierarchically arranged subspaces with the projected data points as a compressed representation of the data set.

2. The method of claim 1, wherein a dimensionality of a hierarchically arranged subspace at a first level of the compressed representation is lower than a dimensionality of a hierarchically arranged subspace at a subsequent level of the compressed representation.

3. The method of claim 1, wherein each subspace is defined by a set of data points that the subspace spans.

4. The method of claim 1, wherein each data point is projected onto a hyperplane of a subspace to which the data point is closest.

5. The method of claim 1, wherein a hierarchically arranged subspace is extendible from a parent subspace by adding one data point.

6. The method of claim 1, wherein the hierarchically arranged subspaces comprise a point representation of the data set and the hierarchically arranged subspaces with the projected data points comprise an axis representation of the data set.

7. The method of claim 1, further comprising the step of decompressing the compressed representation.

8. The method of claim 1, further comprising the step of using the compressed representation of the data set for a nearest neighbor search.

9. The method of claim 8, wherein the using step further comprises creating an indexing structure containing data points associated with the search.

10. The method of claim 9, wherein a pruning process is used to perform the search on the indexing structure.

11. The method of claim 10, wherein data points are sorted in order of increasing bounds.

12. The method of claim 11, wherein index entries of the indexing structure are examined in order of increasing bounds.

13. Apparatus for processing a data set, the apparatus comprising:
    a memory; and
    at least one processor, coupled to the memory, operative to: (i) sample data points from the data set to create hierarchically arranged subspaces from the sampled data points; (ii) project data points from the data set onto the hierarchically arranged subspaces; and (iii) cause the storage of the hierarchically arranged subspaces with the projected data points as a compressed representation of the data set in the memory.

14. The apparatus of claim 13, wherein a dimensionality of a hierarchically arranged subspace at a first level of the compressed representation is lower than a dimensionality of a hierarchically arranged subspace at a subsequent level of the compressed representation.

15. The apparatus of claim 13, wherein each subspace is defined by a set of data points that the subspace spans.

16. The apparatus of claim 13, wherein each data point is projected onto a hyperplane of a subspace to which the data point is closest.

17. The apparatus of claim 13, wherein a hierarchically arranged subspace is extendible from a parent subspace by adding one data point.

18. The apparatus of claim 13, wherein the hierarchically arranged subspaces comprise a point representation of the data set and the hierarchically arranged subspaces with the projected data points comprise an axis representation of the data set.

19. The apparatus of claim 13, wherein the at least one processor is further operative to decompress the compressed representation.

20. The apparatus of claim 13, wherein the at least one processor is further operative to use the compressed representation of the data set for a nearest neighbor search.

21. The apparatus of claim 20, wherein the using operation further comprises creating an indexing structure containing data points associated with the search.

22. The apparatus of claim 21, wherein a pruning process is used to perform the search on the indexing structure.

23. The apparatus of claim 22, wherein data points are sorted in order of increasing bounds.

24. The apparatus of claim 23, wherein index entries of the indexing structure are examined in order of increasing bounds.

25. An article of manufacture for processing a data set, comprising a machine readable medium containing one or more programs which when executed implement the steps of:
    sampling data points from the data set to create hierarchically arranged subspaces from the sampled data points;
    projecting data points from the data set onto the hierarchically arranged subspaces; and
    storing the hierarchically arranged subspaces with the projected data points as a compressed representation of the data set.

26. The article of claim 25, wherein a dimensionality of a hierarchically arranged subspace at a first level of the compressed representation is lower than a dimensionality of a hierarchically arranged subspace at a subsequent level of the compressed representation.

27. The article of claim 25, further comprising the step of using the compressed representation of the data set for a nearest neighbor search.

* * * * *